(12) United States Patent
Rose, Sr.

(10) Patent No.: US 6,472,790 B2
(45) Date of Patent: Oct. 29, 2002

(54) STATOR FOR AN ELECTRIC MOTOR/GENERATOR WITH A HALF-INTEGER WINDING

(75) Inventor: Robert E. Rose, Sr., Fort Atkinson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 8 days.

(21) Appl. No.: 09/774,649

(22) Filed: Feb. 1, 2001

(65) Prior Publication Data

US 2001/0033116 A1 Oct. 25, 2001

Related U.S. Application Data (60) Provisional application No. 60/184,525, filed on Feb. 24, 2000.

(51) Int. Cl.[7] .................................................. H02K 1/00
(52) U.S. Cl. ...................... 310/184; 310/179; 310/184; 310/198
(58) Field of Search ................................. 310/184, 179, 310/180, 185, 187, 201, 208, 166, 198; 29/596, 598, 605, 606

(56) References Cited

U.S. PATENT DOCUMENTS

| | | | |
|---|---|---|---|
| 2,778,962 A | * 1/1957 | Taylor | 310/202 |
| 3,408,517 A | * 10/1968 | Willyoung | 310/198 |
| 3,514,650 A | 5/1970 | Caywood, Jr. | |
| 3,601,642 A | * 8/1971 | Willyoung | 310/198 |
| 3,652,888 A | * 3/1972 | Harrington | 310/198 |
| 4,371,802 A | 2/1983 | Morrill | |
| 4,563,606 A | 1/1986 | Fukasawa et al. | |
| 4,752,707 A | 6/1988 | Morrill | |
| 4,780,634 A | 10/1988 | Masterman | |
| 4,918,347 A | * 4/1990 | Takaba | 310/179 |
| 4,947,072 A | * 8/1990 | Watkins et al. | 310/179 |
| 4,983,867 A | 1/1991 | Sakamoto | |
| 5,057,731 A | 10/1991 | Hancock | |
| 5,714,821 A | * 2/1998 | Dittman | 310/179 |
| 5,804,904 A | 9/1998 | Park et al. | |
| 5,811,905 A | 9/1998 | Tang | |
| 5,825,111 A | 10/1998 | Fei | |
| 5,852,334 A | 12/1998 | Pengov | |
| 6,376,960 B1 | * 4/2002 | Milet et al. | 310/180 |

* cited by examiner

*Primary Examiner*—Joseph Waks
*Assistant Examiner*—Thanh Lam
(74) *Attorney, Agent, or Firm*—Michael Best & Friedrich LLP (57) ABSTRACT

The invention provides a stator for a three-phase induction motor including a core having a plurality of slots that receives wire. The stator further includes a first phase winding wound on the stator having first and second wires electrically connected in parallel. The first wire forms a first group of coils having a first pattern and the second wire forms a second group of coils having a second pattern different than the first pattern. The invention further provides a winding method for the stator.

18 Claims, 4 Drawing Sheets

STATOR FOR AN ELECTRIC MOTOR/GENERATOR WITH A HALF-INTEGER WINDING

This application claims the benefit of U.S. Provisional Application Ser. No. 60/184,525, filed Feb. 24, 2000.

BACKGROUND OF THE INTENTION

The present invention relates to a stator for a polyphase electric motor/generator and, particularly, to a stator for a three-phase motor/generator having three phase windings with each phase winding including two groups of coils electrically connected in parallel.

Three-phase induction motors are important and popular motors used for a variety of applications. Three-phase motors are popular because the horsepower rating of a three-phase induction motor is typically 167 percent more than a single-phase induction motor having the same weight. An exemplary use for a three-phase motor is using the motor as a starter motor for an internal combustion engine. The starter motor assists the internal combustion engine during engine starting until the engine can sufficiently operate without the assistance of the starter motor. The internal combustion engine can be an engine for a lawn mower, tractor, automobile, power-generation system, or the like.

One of the problems with a three-phase induction starter motor of the prior art is having the motor generate enough torque to start or "turn over" the engine. The problem arises because the power source for the starter motor is typically a twelve volt direct current (DC) battery. By capping the power source at twelve volts, the starter motor of the prior art typically cannot generate enough torque by itself to turn over the engine. One solution to this problem is to provide gearing between the starter motor and a crankshaft of the internal combustion engine. The gear ratio of the gears between the motor and the crankshaft is designed to be a ratio sufficient to allow the motor to start the engine. However, the gears are subject to wear and, therefore, have a limited operational life. Accordingly, there is a need for an improved three-phase electric motor that is capable of generating enough torque to start an internal combustion engine without the use of gears.

SUMMARY OF THE INVENTION

The invention provides a polyphase electric motor/generator and a controller. The polyphase motor is typically a three-phase motor/generator having a rotor and a stator. The rotor is interconnected with a drive shaft of the engine such that when the rotor rotates the drive shaft also rotates. The stator includes a core having slots for receiving electrical wire. The stator further includes three phase windings. The three phase windings include wire that is wound in the slots of the core and are electrically connected to the controller. The controller provides a substantially alternating current (AC) three-phase signal to the phase windings resulting in a magnetic field being induced within the core. The interaction of the induced magnetic field with a rotor magnetic field causes the rotor to rotate, which in turn causes the drive shaft to rotate.

The amount of torque a three-phase electric motor generates is dependent upon the amount of electric current flowing in the phase windings. The flow of electric current in the phase windings induces the magnetic field within the stator core for interaction with the rotor magnetic field, resulting in the rotation of the rotor. Assuming everything else is equal, the larger the current in the phase windings, the stronger the magnetic field within the stator core and, consequently, the greater the amount of torque that is generated by the rotor.

One way to increase current flow in the phase windings is to increase the voltage applied by the power source. However, if the voltage of the power source is fixed, such as is the case with an engine having a twelve-volt DC battery, then this is not a practical solution. An alternative way to increase current flow in the phase windings is to use the stator of the invention. The stator of the invention reduces the impedance of the phase windings as seen from the power source. Reducing the impedance of the phase windings increases the amount of current flowing to the phase windings and, therefore, increases the amount of current flow in the phase windings.

Accordingly, a stator of the invention provides a stator core having a plurality of slots that receives electrical wire. The stator further includes a first phase winding wound on the stator including first and second wires electrically connected in parallel. The first wire forms a first group of coils having a first pattern, and the second wire forms a second group of coils having a second pattern. For example, the first wire may form four coils according to a first pattern where the first coil is wound clockwise, the second coil is wound counter-clockwise, the third coil is wound clockwise, and the fourth coil is wound counter-clockwise. Furthermore, for example, the second wire may form four coils according to a second pattern where the first coil is wound counter-clockwise, the second coil is wound clockwise, the third coil is wound counter-clockwise, and the fourth coil is wound clockwise. Thus, the first and second groups of coils have different winding patterns. The stator further includes a second phase winding wound on the stator including third and fourth wires electrically connected in parallel. The third wire forms a third group of coils having the first pattern and the fourth wire forms a fourth group of coils having the second pattern. The stator further includes a third phase winding wound on the stator comprising fifth and sixth wires electrically connected in parallel. The fifth wire forms a fifth group of coils having the first pattern and the sixth wire forms a sixth group of coils having the second pattern. Of course, each pattern could be extended to include additional coils.

The stator of the invention further provides that the first phase winding is wound such that an end of the first wire and an end of the second wire are disposed in the same slot and are electrically connected together, the second phase winding is wound such that an end of the third wire and an end of the fourth wire are disposed in the same slot and are electrically connected together, and the third phase winding is wound such that an end of the fifth wire and an end of the sixth wire are disposed in the same slot and are electrically connected together. Additionally, the invention further provides that the remaining ends of the first, second, third, fourth, fifth and sixth wires are electrically connected together.

By connecting the first group of coils in parallel with the second group of coils, the resultant impedance as seen from the power source is reduced in half when compared to connecting the first and second group of coils in series. Similarly, by connecting the third group of coils in parallel with the fourth group of coils, the resultant impedance as seen from the power source is reduced in half when compared to connecting the third and fourth group of coils in series. In addition, by connecting the fifth group of coils in parallel with the sixth group of coils, the resultant impedance as seen from the power source is reduced in half when compared to connecting the fifth and sixth group of coils in series. Thus, the overall impedance of the stator windings as seen from the power source is substantially reduced by the parallel connection. Reducing the overall impedance increases the amount of current flowing to the phase windings and, therefore, the overall torque of the motor is increased.

One of the potential drawbacks to increasing the current flowing to the stator is that the amount of heat being generated by the windings increases. However, another advantage of electrically connecting two groups of coils for each phase winding in parallel is that the current flowing to the stator splits between the two groups of coils. Splitting the current flow results in less heat being generated by the phase windings when compared to connecting two groups of coils for each phase winding in series.

The stator of the invention further provides that each coil has one or more turns. Assuming that the wire for each phase winding has the same cross-sectional area (e.g., if the wire for each phase winding is round, then each wire will have the same gauge), increasing the number of turns for each coil increases the impedance for the coil. Moreover, it should be apparent that reducing the number of turns for each coil reduces the impedance of each winding. Assuming that a constant voltage is applied to the windings, reducing the impedance increases the amount of current flow within the winding. However, increasing the amount of current flow while reducing the number of turns for each coil results in more heat being generated. Thus, reducing the number of turns for each coil from (x) turns to (x−1) turns (e.g., from three turns to two turns) may result in too large of a temperature increase. Too large of a temperature increase may result in damage to the motor.

Another advantage of connecting the group of coils in parallel results in the "half-integer" winding. If the number of turns for each coil is an odd number and each phase is connected in parallel, then, as seen from the power source, each coil appears to have a "half-integer" winding. For example, if the first and second group of coils are connected in parallel and each coil has three turns, then, as seen from the power source, each coil has the electrical equivalent of one and one-half turns.

In a second aspect of the invention, a stator for a three-phase motor includes first, second, and third phase windings wound on the stator. Each phase winding includes coils forming at least four poles, where the number of poles is represented by the number (m), and (m) is an even number. The coils forming the poles are divided into two groups, the first group includes the coils for poles one to (m/2) and the second group includes the coils for poles ((m/2)+1) to (m). The coils forming the odd-numbered poles of the first group and the even-numbered poles of the second group are wound in a first direction (e.g., clockwise). The coils forming the even-numbered poles of the first group and the odd-numbered poles of the second group are wound in a second direction opposite the first direction (e.g., counterclockwise). The advantage of the just described winding arrangement is that, for each phase winding, one end of a first wire forming the first group of coils and one end of a second wire forming the second group of coils are disposed next to each other in the same slot. The two wires disposed next to each other can be easily connected to the controller without using "jumper wires". In other words, for each phase winding, there is no need to bridge a wire between the two disposed-together ends before connecting the wires to the controller. Removing the bridge reduces the complexity of the phase windings, reduces the number of required connections between the first and second coils of each phase winding, and reduces the cost of manufacturing the stator of the invention.

The invention further includes a method of winding a stator for a three-phase motor. The method includes the steps of providing a core comprising a plurality of slots. The method further includes winding a first phase winding having first and second wires. The winding of the first phase winding includes the steps of placing one end of the first wire in a first slot, and winding the first wire on the core by a first pattern to form a first group of coils. The first group of coils forms at least two poles, where the number of poles is represented by the number (n) and the poles are numbered from 1 to (n). The winding of the first phase winding further includes winding the second wire on the core by a second pattern different than the first pattern to form a second group of coils. The second group of coils forms (n) poles and the poles are numbered from 1 to (n). The winding of the second wire results in an end of the second wire being disposed in the first slot.

The method further includes winding a second phase winding having third and fourth wires. The winding of the second phase winding includes the steps of placing one end of the third wire in a second slot, and winding the third wire on the core by the first pattern to form a third group of coils. The third group of coils forms (n) poles and the poles are numbered from 1 to (n). The winding of the second phase winding further includes winding the fourth wire on the core by the second pattern to form a fourth group of coils. The fourth group of coils forms (n) poles and the poles are numbered from 1 to (n). The winding of the fourth wire results in an end of the fourth wire being disposed in the second slot.

The method further includes winding a third phase winding having fifth and sixth wires. The winding of the third phase winding includes the steps of placing one end of the fifth wire in a third slot, and winding the fifth wire on the core by the first pattern to form a fifth group of coils. The fifth group of coils forms (n) poles and the poles are numbered from 1 to (n). The winding of the third phase winding further includes winding the sixth wire on the core by the second pattern to form a sixth group of coils. The sixth group of coils forms (n) poles and the poles are numbered from 1 to (n). The winding of the sixth wire results in an end of the sixth wire being disposed in the third slot.

The method further includes repeating the steps of winding the first phase winding, winding the second phase winding, and winding the third phase winding for a second set of each phase windings. By winding more than one set of phase windings, a user can increase the effective cross-sectional area of wire for each phase winding. For example, if two identical sets of phase windings are wound on the stator, then the effective cross-sectional area for each phase is twice the cross-sectional area if only one set of phase windings is wound on the stator. Increasing the effective cross-sectional area allows for more current to flow through each phase and allows each phase winding to generate less heat.

Other features and advantages of the invention will become apparent by consideration of the detailed description and accompanying drawings.

DETAILED DESCRIPTION

Before one embodiment of the invention is explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

Figure 1:
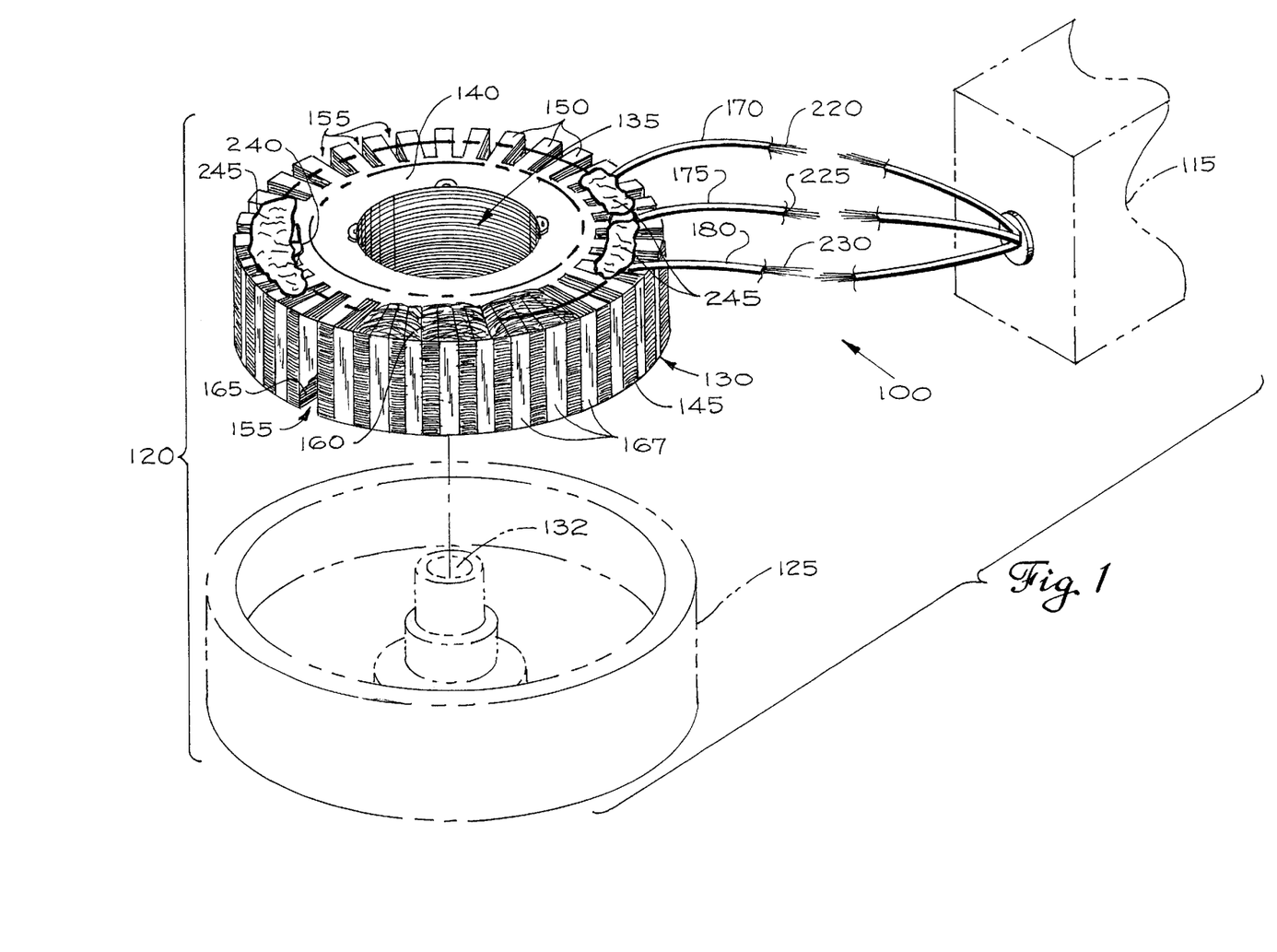
FIG. 1 is a partially exploded view of a three-phase starter motor having a stator embodying the invention.

A system 100 embodying the invention is shown in an exploded view in FIG. 1. The system 100 generally includes a controller 115 (shown in phantom) and a three-phase induction starter motor/generator 120. Although the invention will be described as being embodied in a starter motor, the invention can be used for any polyphase induction motor/generator. The controller 115 is connected to a twelve-volt direct current (DC) battery (not shown) and provides a substantially alternating current (AC) three-phase signal to the motor 120. The three-phase signal to the motor 120 activates the motor 120 allowing the motor 120 to start an engine (not shown). Once the engine has started and is running at a sufficient speed, the motor 120 may be used as a generator. When this occurs, the engine commutates the motor 120 creating a substantially AC three-phase signal. The created three-phase signal is applied to the controller 115 for charging the DC power source and/or is applied to any internal or external devices connected to the controller (e.g., vehicle headlights or through a 120 volt AC inverter). A controller suitable for use with the present invention is shown in U.S. patent application Ser. No. 60/184,525, filed on Feb. 24, 2000, the disclosure of which is incorporated by reference herein. Of course other controllers and other power sources that provide a three-phase signal can be used with the system 100.

The motor 120 includes a rotor 125 (shown in phantom) that is coaxially aligned with a stator 130. The rotor 125 includes a first central opening 132 for receiving a drive shaft (not shown) of the engine. Upon applying the three-phase signal to the motor 120, the stator 130 is excited such that it induces the rotor 125 to rotate. When the rotor 125 rotates, the drive shaft coupled to the rotor 125 also rotates. If the rotation of the drive shaft results in a sufficient torque to "turn over" the engine, then the engine will start. After the engine starts and is running at a running speed, the controller 115 switches to the generating mode. While the engine is operating at the running speed, the drive shaft of the engine rotates causing rotor 125 of the motor 120 to also rotate. The rotating rotor 125 induces a magnetic field within the stator 130 causing a three-phase signal to be generated. The three-phase signal is applied to the controller 115. A rotor suitable for use with the present invention is a flywheel-rotor shown in U.S. patent application Ser. No. 09/442,560 filed on Nov. 18, 1999, the disclosure of which is incorporated by reference herein. Of course other rotors can be can be used with the motor 120.

The motor 120 includes a stator 130 with a second central opening 135. The stator is mounted on an engine frame (not shown) such that the second central opening 135 receives a portion of the rotor 125 and that the rotor 125 is allowed to rotate around the stator 130.

The stator 130 includes a magnetically permeable stator core 140. The core 140 is of generally cylindrical shape formed by a plurality of stacked laminations 145 mechanically interconnected together. Alternatively, the core can be a solid core formed by one magnetically permeable member.

Figures 3, 3A:
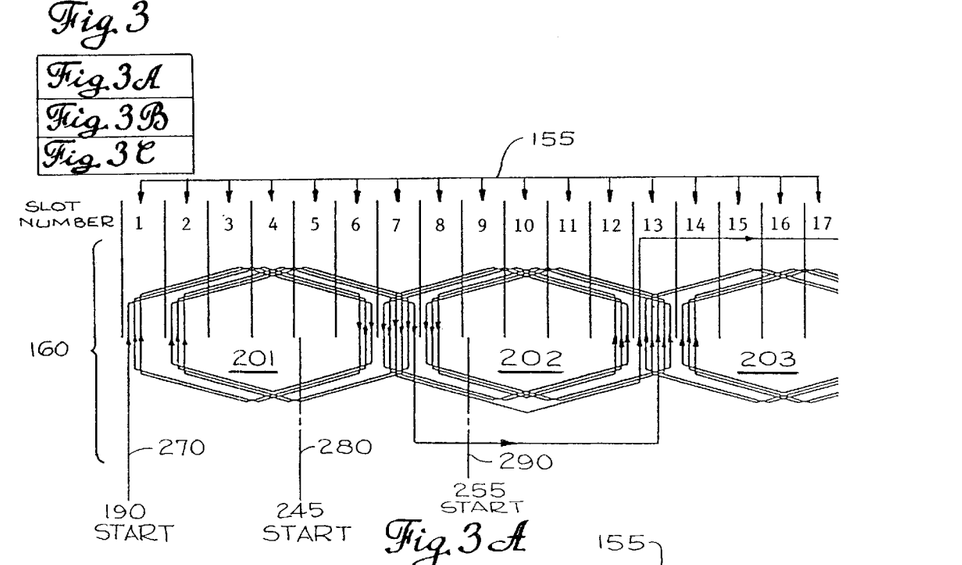
FIG. 3 is a schematic diagram representing a first winding pattern for a stator embodying the invention.
Figure 3B:
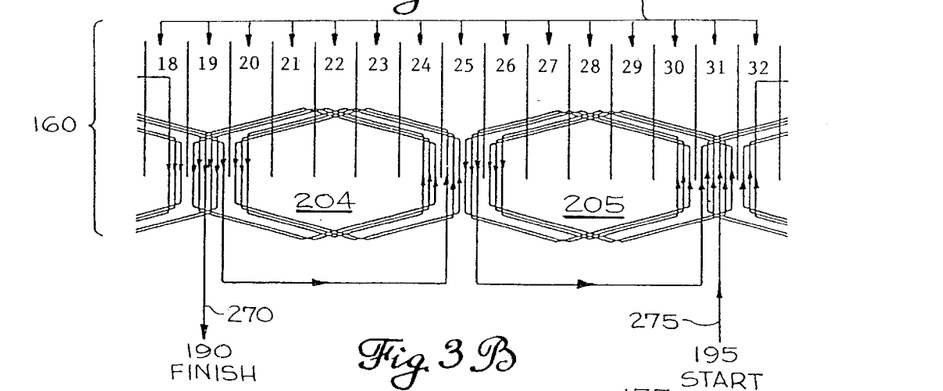
Figure 3C:
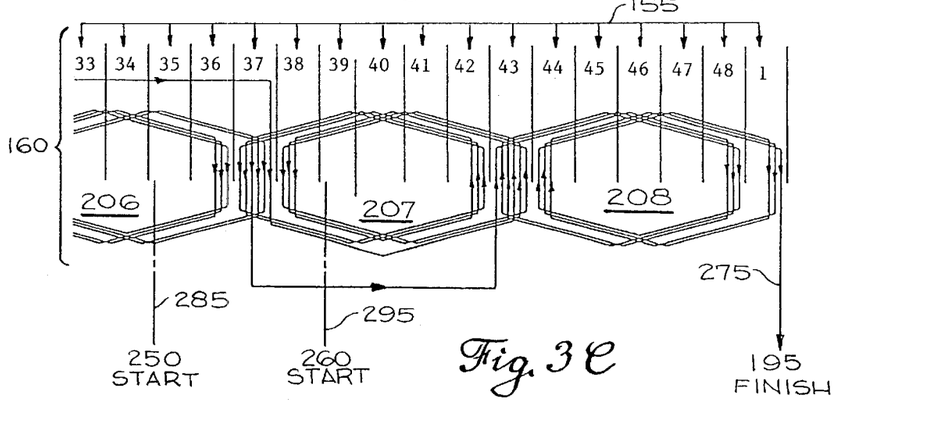
Figures 4, 4A:
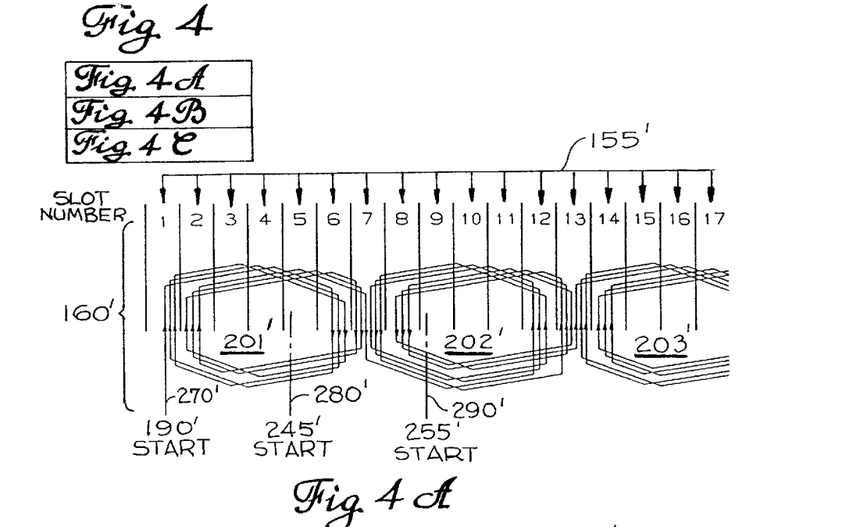
FIG. 4 is a schematic diagram representing a second winding pattern for a stator embodying the invention.
Figure 4B:
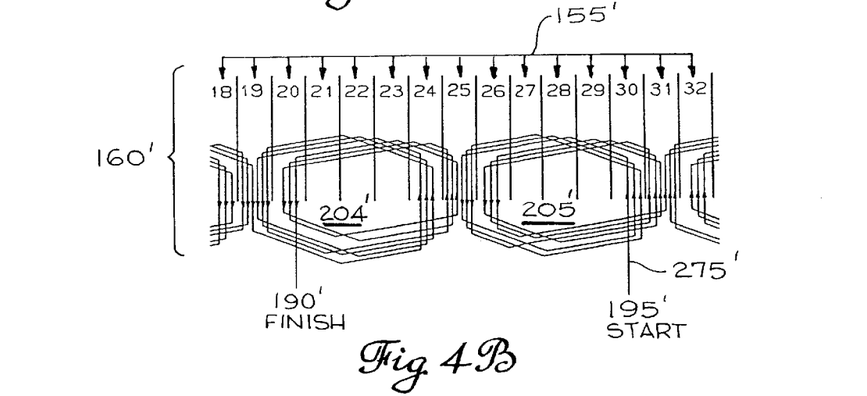
Figure 4C:
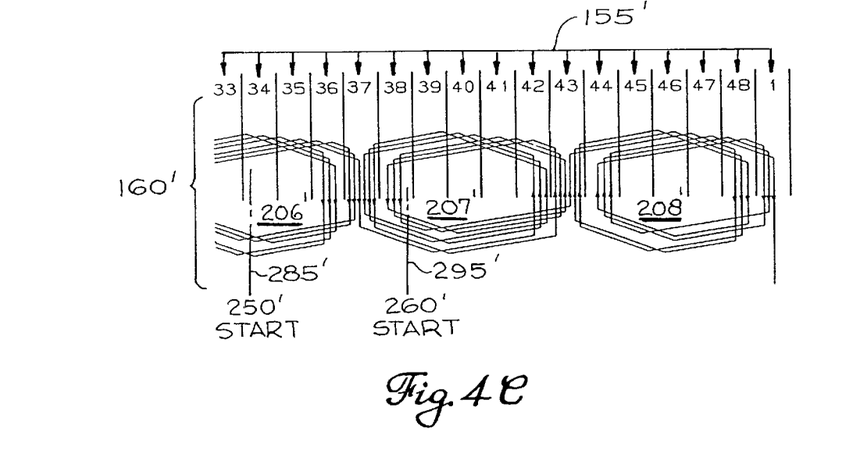

As shown in FIG. 1, each lamination includes a plurality of radially-extending teeth 150 that define a plurality of cavities or slots 155 (also schematically shown in FIGS. 3 and 4). The slots 155 receive electrical wires 160 (partially shown in FIG. 1) that are wound around one or more teeth 150 to form coils (discussed below). In the embodiment shown, the teeth 150 form forty-eight slots 155 (FIGS. 3 and 4) for receiving wire 160. Of course the number of teeth 150 and, consequently, the number of slots 155 can vary depending on the application of the invention.

As shown in FIG. 1, slot insulators 165, made of a non-conducting material such as cardboard or paper, align the inner surfaces of the slots 155. Wedge insulators 167 cover the outer radial portion of the slots 155. In the embodiment shown, the slots 155 formed by teeth 150 are open towards the outward radial portion of the stator 130. Of course other stator configurations are possible including configurations with the slots of the stator teeth opening towards the radially inward portion of the stator.

Figure 2:
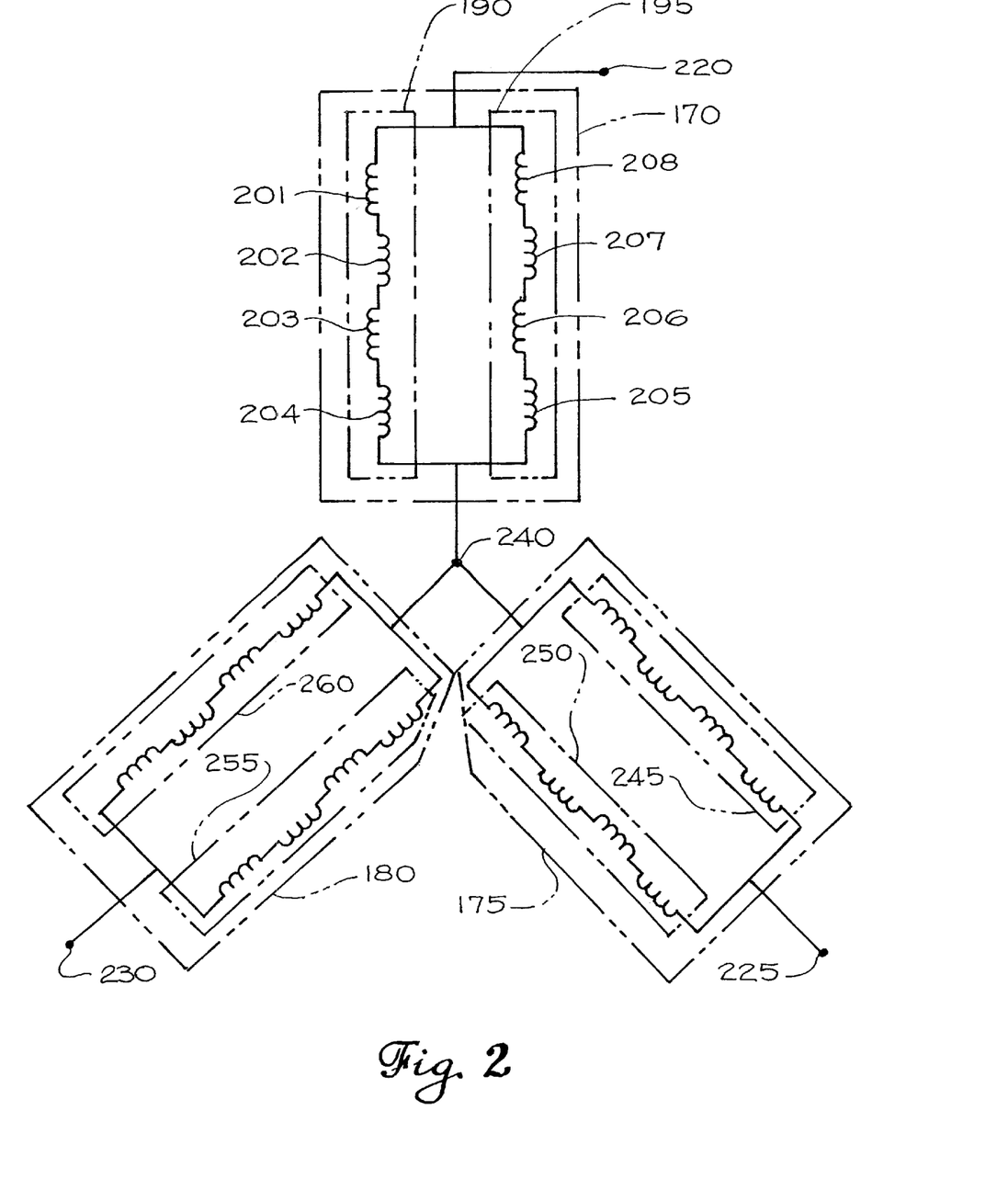
FIG. 2 is a circuit diagram of a stator embodying the invention.

The stator 130 shown in the figures is for a three-phase induction motor/generator 120 and includes three phase windings 170, 175 and 180. However, the stator of the invention can be used with any polyphase motor/generator having any number of phase windings. As schematically shown in FIG. 2, each phase winding 170, 175 and 180 are identical, and thus, only phase winding 170 will be discussed in detail. Phase winding 170 includes a first group of coils 190 and a second group of coils 195 electrically connected in parallel. The coils for phase winding 190 form (m) poles 201–208 where (m) is even and (m) is at least four. For the embodiment shown, (m) is equal to 8. The number of poles in each group 190 and 195 is equal to (m/2). The number of poles in each group 190 and 195 is represented by the number (n), and, for the embodiment shown, (n) is equal to four. The coils for group 190 form poles 201, 202, 203 and 204. The coils for group 195 form poles 205, 206, 207 and 208. Each coil has (x) turns where (x) is odd. As will be described in more detail below, for the embodiment shown, each pole includes two coils wound in a six/five pitch configuration with each coil having three turns. Of course the number of poles, the pitch configuration and the number of turns can vary depending on the application of the invention.

As is schematically represented in FIG. 2, the first group of coils 190 is wound in a first pattern and the second group of coils 195 is wound in a second pattern where the second pattern is different than the first pattern. For example, the first pattern may have the coils forming poles 201 and 203 being wound in a clockwise direction and the coils forming poles 202 and 204 being wound in a counter-clockwise direction, and the second pattern may have the coils forming poles 205 and 207 being wound in a counterclockwise direction and the coils forming poles 206 and 208 being wound in a clockwise direction. Alternatively, the first pattern may have the coils forming poles 201 and 203 being wound in a counter-clockwise direction and the coils forming poles 202 and 204 being wound in a clockwise direction, and the second pattern may have the coils forming poles 205 and 207 being wound in a clockwise direction and the coils forming poles 206 and 208 being wound in a counter-clockwise direction.

Phase windings 170, 175 and 180 each have two ends. One end of each phase winding forms a lead 220, 225 and 230 that is electrically connected to the controller 115 (FIG. 1). The other end of each phase winding is electrically connected together at node 240 (also shown in FIG. 1). This results in the phase windings 170, 175 and 180 forming a Y-configuration. As shown in FIG. 1, the ends forming leads 220, 225 and 230 and the node 240 are fixed to the stator 130 by non-conductive epoxy 245. Non-conductive epoxy 245 prevents leads 220, 225 and 230 and node 240 from moving.

FIG. 3 schematically shows a first exemplary winding scheme for an eight-pole, three-phase motor/generator having coils wound with a six/five pitch configuration. FIG. 4 schematically shows a second exemplary winding scheme for an eight-pole, three-phase motor/generator having coils wound with a six/five pitch configuration. Because the winding of each phase winding is similar and in order to simplify FIGS. 3 and 4, only phase winding 170 (FIG. 3) is shown in detail. As was described above, the stator core 130 has a plurality of teeth which form cavities or slots 155. For the embodiments shown in FIGS. 3 and 4, there are forty-eight slots numbered from 1 to 48. Slots 1–48 are capable of receiving wire 160 (FIG. 1) which forms phase windings 170, 175 and 180.

A first exemplary winding scheme for phase winding 170 is shown in FIG. 3 and is as follows. First, wire 270, which forms the first group of coils 190 (also shown in FIG. 2), is placed in slot 1 such that one end of the wire 270 recedes from the slot to form part of lead 220. The other end is wound around the stator 130. The wire 270 is first wound in a clockwise direction to create two coils forming pole 201. First, the wire 270 is wound from slot 1 to slot 6 and then back to slot 1 for two complete windings or turns. After completion of the second turn, the wire 270 is wound from slot 1 to slot 6 which completes the first coil forming pole 201. Next, the wire 270 is wound from slot 6 to slot 2. From slot 2 the wire 270 is wound in a clockwise direction to create the second coil forming pole 201. First, the wire 270 is wound from slot 2 to slot 7 and then back to slot 2 for two complete turns. After completion of the second turn, the wire 270 is wound from slot 2 to slot 7 which completes the second coil for pole 201. The winding configuration just described is called a six/five pitch configuration with each coil having three turns. The six/five pitch configuration results because, for the first coil, each turn spans six slots from slot 1 to slot 6. After completing the first coil, the wire 270 spans five slots from slot 6 back to slot 2. After returning back to slot 2, each turn of the second coil spans six slots from slot 2 to slot 7. Therefore, the half-turn between the first and second coil is five slots and the turns for each coil spans six slots, which is typically referred to as a six/five pitch configuration.

After competition of the coils for pole 201, the wire 270 is wound from slot 7 to slot 13. From slot 13, the wire 270 is wound in a counter-clockwise direction to create two coils forming pole 202. First, the wire 270 is wound from slot 13 to slot 8 and then back to slot 13 for two complete turns. After completion of the second turn, the wire 270 is wound from slot 13 to slot 8 which completes the first coil forming pole 202. Next, the wire 270 is wound from slot 8 to slot 12. From slot 12 the wire 270 is wound in a counter-clockwise direction to create the second coil forming pole 202. First, the wire 270 is wound from slot 12 to slot 7 and then back to slot 12 for two complete turns. After completion of the second turn, the wire 270 is wound from slot 12 to slot 7 which completes the second coil forming pole 202. Similar to pole 201, the winding configuration just described is a six/five pitch configuration with each coil having three turns.

After competition of the coils for pole 202, the wire 270 is wound from slot 7 to slot 13. From slot 13, the wire 270 is wound in a clockwise direction to create two coils forming pole 203. First, the wire 270 is wound from slot 13 to slot 18 and then back to slot 13 for two complete turns. After completion of the second turn, the wire 270 is wound from slot 13 to slot 18 which completes the first coil forming pole 203. Next, the wire 270 is wound from slot 18 to slot 14. From slot 14 the wire 270 is wound in a clockwise direction to create the second coil forming pole 203. First, the wire 270 is wound from slot 14 to slot 19 and then back to slot 14 for two complete turns. After completion of the second turn, the wire 270 is wound from slot 14 to slot 19 which completes the second coil forming pole 203. Similar to pole 201, the winding configuration just described is a six/five pitch configuration with each coil having three turns.

After competition of the coils for pole 203, the wire 270 is wound from slot 19 to slot 25. From slot 25, the wire 270 is wound in a counter-clockwise direction to create two coils forming pole 204. First, the wire 270 is wound from slot 25 to slot 20 and then back to slot 25 for two complete turns. After completion of the second turn, the wire 270 is wound from slot 25 to slot 20 which completes the first coil forming pole 204. Next, the wire 270 is wound from slot 20 to slot 24. From slot 24 the wire 270 is wound in a counter-clockwise direction to create the second coil forming pole 204. First, the wire 270 is wound in from slot 24 to slot 19 and then back to slot 24 for two complete turns. After completion of the second turn, the wire 270 is wound from slot 24 to slot 19 which completes the second coil forming pole 204. Similar to pole 201, the winding configuration just described is a six/five pitch configuration having three turns. The wire 270 then exits the stator core at slot 19 which results in the finish of the first group of coils 190. The wire 270 is then cut to be sufficiently long enough to electronically connect first wire 270 to the other wires at node 240 (described below).

Second wire 275, which forms the group of coils 195, is placed in slot 31 such that one end of the wire 275 sufficiently recedes from the slot 31 to be connected with the other wires at node 240 (described below). The other end is wound around the stator 130. First, the wire 275 is wound in a counter-clockwise direction from slot 31 to slot 26 and then back to slot 31 for two complete turns. After completion of the second turn, the wire 275 is wound from slot 31 to slot 26 which completes the first coil forming pole 205. Next, the wire 275 is wound from slot 26 to slot 30. From slot 30 the wire 275 is wound in a counter-clockwise direction to create the second coil forming pole 205. First, the wire 275 is wound from slot 30 to slot 25 and then back to slot 30 for two complete turns. After completion of the second turn, the wire 275 is wound from slot 30 to slot 25 which completes the second coil for pole 205. Similar to pole 205, the winding configuration just described is a six/five pitch configuration having three turns.

After competition of the coils for pole 205, the wire 275 is wound from slot 25 to slot 31. From slot 31, the wire 275 is wound in a clockwise direction to create two coils forming pole 206. First, the wire 275 is wound from slot 31 to slot 36 and then back to slot 31 for two complete turns. After completion of the second turn, the wire 275 is wound from slot 31 to slot 36 which completes the first coil forming pole 206. Next, the wire 275 is wound from slot 36 to slot 32. From slot 32 the wire 275 is wound in a clockwise direction to create the second coil forming pole 206. First, the wire 275 is wound from slot 32 to slot 37 and then back to slot 32 for two complete turns. After completion of the second turn, the wire 275 is wound from slot 32 to slot 37 which completes the second coil forming pole 206. Similar to pole 201, the winding configuration just described is a six/five pitch configuration with each coil having three turns.

After competition of the coils for pole 206, the wire 275 is wound from slot 37 to slot 43. From slot 43, the wire 275 is wound in a counter-clockwise direction to create two coils forming pole 207. First, the wire 275 is wound from slot 43 to slot 38 and then back to slot 43 for two complete turns. After completion of the second turn, the wire 275 is wound from slot 43 to slot 38 which completes the first coil forming pole 207. Next, the wire 275 is wound from slot 38 to slot 42. From slot 42 the wire 275 is wound in a counter-clockwise direction to create the second coil forming pole 207. First, the wire 275 is wound from slot 42 to slot 37 and then back to slot 42 for two complete turns. After completion of the second turn, the wire 275 is wound from slot 42 to slot 37 which completes the second coil forming pole 207. Similar to pole 201, the winding configuration just described is a six/five pitch configuration with each coil having three turns.

After competition of the coils for pole 207, the wire 275 is wound from slot 37 to slot 43. From slot 43, the wire 275 is wound in a clockwise direction to create two coils forming pole 208. First, the wire 275 is wound from slot 43 to slot 48 and then back to slot 43 for two complete turns. After completion of the second turn, the wire 275 is wound from slot 43 to slot 48 which completes the first coil forming pole 208. Next, the wire 275 is wound from slot 48 to slot 44. From slot 44 the wire 275 is wound in a clockwise direction to create the second coil forming pole 208. First, the wire 275 is wound from slot 44 to slot 1 and then back to slot 44 for two complete turns. After completion of the second turn, the wire 275 is wound from slot 44 to slot 1 which completes the second coil forming pole 208. Similar to pole 201, the winding configuration just described is a six/five pitch configuration having three turns. The second wire 275 then exits the stator core at slot 1 which results in the finish of the second group of coils 195. By having a second pattern which reverses the wiring technique of the first pattern, one end of each wire 270 and 275 are disposed in the same slot (i.e., slot 1). Since one end of each wire ends in the same slot, the stator does not require "jumper wire" to make the electrical connections to form lead wire 220. Removing the "jumper wire" reduces the complexity in winding the phase windings, reduces the number of required connections for the phase winding, and reduces the cost of manufacturing the stator 130.

Phase winding 175 is wound similar to phase winding 170. However, instead of starting third wire 280 (shown in phantom) forming the third group of coils 245 (also shown in FIG. 2) in slot 1, wire 280 starts in slot 5. This results in wire 280 finishing in slot 23 (not shown). Similarly, rather than starting fourth wire 285 (shown in phantom) forming the fourth group of coils 250 (also shown in FIG. 2) in slot 31, fourth wire 285 starts in slot 35. This results in wire 285 finishing in slot 5 (not shown).

Phase winding 180 is wound similar to phase winding 170. However, instead of starting fifth wire 290 (shown in phantom) forming the fifth group of coils 255 (also shown in FIG. 2) in slot 1, wire 290 starts in slot 9. This results in wire 290 finishing in slot 27 (not shown). Similarly, rather than starting sixth wire 295 (shown in phantom) forming the sixth group of coils 260 (also shown in FIG. 2) in slot 31, sixth wire 295 starts in slot 39. This results in wire 295 finishing in slot 9 (not shown).

In addition to what has been described thus far, a second set of phase windings (not shown) can be wound on the stator. The second set of phase windings is wound on top of phase windings 170, 175 and 180. By adding additional sets of phase windings, the effective cross-sectional area of each phase winding increases and results in a lower impedance.

As shown in FIG. 1, upon completing of a satisfactory number of sets, the wires at slot 1 are electrically connected together to form lead 220, the wires at slot 5 are electrically connected together to form lead 225, and the wires at slot 9 are electrically connected together to form lead 230. The leads 220, 225 and 230 are electrically connected to the controller 115 (FIG. 1). Additionally, the wires in slots 19, 23, 27, 31, 35 and 39 are electrically connected together to form node 240. The resulting electric circuit is schematically shown in FIG. 2.

A second exemplary winding scheme for phase winding 170' is shown in FIG. 4. The winding scheme shown in FIG. 4 may be used in alternative to the winding scheme shown in FIG. 3. The winding scheme shown in FIG. 4 is used with winding machinery that is unable to index backwards. For example, for the embodiment shown in FIG. 3, a winding machine needs to be able to index backwards when creating the six/five pitch configuration for poles 202, 204, 205 and 207. For a specific example, the first coil of pole 202 is wound in slots 8 and 13 (FIG. 3) and the second coil of pole 202 is wound in slots 7 and 12. Going from the first coil of pole 202 to the second coil of pole 202 requires a winding machine to index backwards. Alternatively, the winding scheme shown in FIG. 4 always indexes forward when creating the six/five pitch configuration for poles 201'–208'.

With reference to FIG. 4, wire 270', which forms the first group of coils 190' (also shown in FIG. 2), is placed in slot 1 such that one end of the wire 270' recedes from the slot to form part of lead 220'. The other end is wound around the stator 130'. The wire 270' is first wound in a clockwise direction to create two coils forming pole 201'. First, the wire 270' is wound from slot 1 to slot 6 and then back to slot 1 for two complete windings or turns. After completion of the second turn, the wire 270' is wound from slot 1 to slot 6 which completes the first coil forming pole 201'. Next, the wire 270' is wound from slot 6 to slot 2. From slot 2 the wire 270' is wound in a clockwise direction to create the second coil forming pole 201'. First, the wire 270' is wound from slot 2 to slot 7 and then back to slot 2 for two complete turns. After completion of the second turn, the wire 270' is wound from slot 2 to slot 7 which completes the second coil for pole 201'.

After competition of the coils for pole 201', the wire 270' is wound from slot 7 to slot 12. From slot 12, the wire 270' is wound in a counter-clockwise direction to create two coils forming pole 202'. First, the wire 270' is wound from slot 12 to slot 7 and then back to slot 12 for two complete turns. After completion of the second turn, the wire 270' is wound from slot 12 to slot 7 which completes the first coil forming pole 202'. Next, the wire 270' is wound from slot 7 to slot 13. From slot 13 the wire 270' is wound in a counter-clockwise direction to create the second coil forming pole 202'. First, the wire 270' is wound from slot 13 to slot 8 and then back to slot 13 for two complete turns. After completion of the second turn, the wire 270' is wound from slot 13 to slot 8 which completes the second coil forming pole 202'.

After competition of the coils for pole 202', the wire 270' is wound from slot 8 to slot 13. From slot 13, the wire 270' is wound in a clockwise direction to create two coils forming pole 203'. First, the wire 270' is wound from slot 13 to slot 18 and then back to slot 13 for two complete turns. After completion of the second turn, the wire 270' is wound from slot 13 to slot 18 which completes the first coil forming pole 203'. Next, the wire 270' is wound from slot 18 to slot 14. From slot 14 the wire 270' is wound in a clockwise direction to create the second coil forming pole 203'. First, the wire 270' is wound from slot 14 to slot 19 and then back to slot 14 for two complete turns. After completion of the second turn, the wire 270' is wound from slot 14 to slot 19 which completes the second coil forming pole 203'.

After competition of the coils for pole 203', the wire 270' is wound from slot 19 to slot 24. From slot 24, the wire 270' is wound in a counter-clockwise direction to create two coils forming pole 204'. First, the wire 270' is wound from slot 24 to slot 19 and then back to slot 24 for two complete turns. After completion of the second turn, the wire 270' is wound from slot 24 to slot 19 which completes the first coil forming pole 204'. Next, the wire 270' is wound from slot 19 to slot 25. From slot 25 the wire 270' is wound in a counter-clockwise direction to create the second coil forming pole 204'. First, the wire 270' is wound in from slot 25 to slot 20 and then back to slot 25 for two complete turns. After completion of the second turn, the wire 270' is wound from slot 25 to slot 20 which completes the second coil forming pole 204'. The wire 270' then exits the stator core at slot 20 which results in the finish of the first group of coils 190'. The wire 270' is then cut to be sufficiently long enough to electronically connect first wire 270' to the other wires at node 240'.

Second wire 275', which forms the group of coils 195', is placed in slot 30 such that one end of the wire 275' sufficiently recedes from the slot 30 to be connected with the other wires at node 240'. The other end is wound around the stator 130'. First, the wire 275' is wound in a counter-clockwise direction from slot 30 to slot 25 and then back to slot 30 for two complete turns. After completion of the second turn, the wire 275' is wound from slot 30 to slot 25 which completes the first coil forming pole 205'. Next, the wire 275' is wound from slot 25 to slot 31. From slot 31 the wire 275' is wound in a counter-clockwise direction to create the second coil forming pole 205'. First, the wire 275' is wound from slot 31 to slot 26 and then back to slot 31 for two complete turns. After completion of the second turn, the wire 275' is wound from slot 31 to slot 26 which completes the second coil for pole 205'.

After competition of the coils for pole 205', the wire 275' is wound from slot 26 to slot 31. From slot 31, the wire 275' is wound in a clockwise direction to create two coils forming pole 206'. First, the wire 275' is wound from slot 31 to slot 36 and then back to slot 31 for two complete turns. After completion of the second turn, the wire 275' is wound from slot 31 to slot 36 which completes the first coil forming pole 206'. Next, the wire 275' is wound from slot 36 to slot 32. From slot 32 the wire 275' is wound in a clockwise direction to create the second coil forming pole 206'. First, the wire 275' is wound from slot 32 to slot 37 and then back to slot 32 for two complete turns. After completion of the second turn, the wire 275' is wound from slot 32 to slot 37 which completes the second coil forming pole 206'.

After competition of the coils for pole 206', the wire 275' is wound from slot 37 to slot 42. From slot 42, the wire 275' is wound in a counter-clockwise direction to create two coils forming pole 207'. First, the wire 275' is wound from slot 42 to slot 37 and then back to slot 42 for two complete turns. After completion of the second turn, the wire 275' is wound from slot 42 to slot 37 which completes the first coil forming pole 207'. Next, the wire 275' is wound from slot 37 to slot 43. From slot 43 the wire 275' is wound in a counter-clockwise direction to create the second coil forming pole 207'. First, the wire 275' is wound from slot 43 to slot 38 and then back to slot 43 for two complete turns. After completion of the second turn, the wire 275' is wound from slot 43 to slot 38 which completes the second coil forming pole 207'.

After competition of the coils for pole 207', the wire 275' is wound from slot 38 to slot 43. From slot 43, the wire 275' is wound in a clockwise direction to create two coils forming pole 208'. First, the wire 275' is wound from slot 43 to slot 48 and then back to slot 43 for two complete turns. After completion of the second turn, the wire 275' is wound from slot 43 to slot 48 which completes the first coil forming pole 208'. Next, the wire 275' is wound from slot 48 to slot 44. From slot 44 the wire 275' is wound in a clockwise direction to create the second coil forming pole 208'. First, the wire 275' is wound from slot 44 to slot 1 and then back to slot 44 for two complete turns. After completion of the second turn, the wire 275' is wound from slot 44 to slot 1 which completes the second coil forming pole 208'. The second wire 275' then exits the stator core at slot 1 which results in the finish of the second group of coils 195'. Similar to the embodiment shown in FIG. 3, by having a second pattern which reverses the wiring technique of the first pattern, one end of each wire 270' and 275' is disposed in the same slot (i.e., slot 1). Since one end of each wire ends in the same slot, the stator does not require "jumper wire" to make the electrical connections to form lead wire 220'. Removing the "jumper wire" reduces the complexity in winding the phase windings, reduces the number of required connections for the phase winding, and reduces the cost of manufacturing the stator 130'.

Phase winding 175' is wound similar to phase winding 170'. However, instead of starting third wire 280' (shown in phantom) forming the third group of coils 245' (also shown in FIG. 2) in slot 1, wire 280' starts in slot 5. This results in wire 280' finishing in slot 24 (not shown). Similarly, rather than starting fourth wire 285' (shown in phantom) forming the fourth group of coils 250' (also shown in FIG. 2) in slot 30, fourth wire 285' starts in slot 34. This results in wire 285' finishing in slot 5 (not shown).

Phase winding 180' is wound similar to phase winding 170'. However, instead of starting fifth wire 290' (shown in phantom) forming the fifth group of coils 255 (also shown in FIG. 2) in slot 1, wire 290' starts in slot 9. This results in wire 290' finishing in slot 28 (not shown). Similarly, rather than starting sixth wire 295' (shown in phantom) forming the sixth group of coils 260' (also shown in FIG. 2) in slot 30, sixth wire 295' starts in slot 38. This results in wire 295' finishing in slot 9 (not shown).

In addition to what has been described thus far, a second set of phase windings (not shown) can be wound on the stator. The second set of phase windings is wound on top of phase windings 170', 175' and 180'. By adding additional sets of phase windings, the effective cross-sectional area of each phase winding increases and results in a lower impedance.

As shown in FIG. 1, upon completing of a satisfactory number of sets, the wires at slot 1 are electrically connected together to form lead 220', the wires at slot 5 are electrically connected together to form lead 225', and the wires at slot 9 are electrically connected together to form lead 230'. The leads 220', 225' and 230' are electrically connected to the controller 115' (FIG. 1). Additionally, the wires in slots 20, 24, 28, 30, 34 and 38 are electrically connected together to form node 240'. The resulting electric circuit is schematically shown in FIG. 2.

As can be seen from the above, the present invention provides an electric motor with a half-integer winding. Various features and advantages of the invention are set forth in the following claims.

What is claimed is:

1. A stator for a three-phase induction motor, comprising:
    a core having a plurality of slots that receives wire;
    a first phase winding wound on the stator comprising first and second wires electrically connected in parallel, the first wire forms a first group of coils having a first pattern and the second wire forms a second group of coils having a second pattern different than the first pattern;
    a second phase winding wound on the stator comprising third and fourth wires electrically connected in parallel, the third wire forms a third group of coils having the first pattern and the fourth wire forms a fourth group of coils having the second pattern; and
    a third phase winding wound on the stator comprising fifth and sixth wires electrically connected in parallel, the fifth wire forms a fifth group of coils having the first pattern and the sixth wire forms a sixth group of coils having the second pattern.

2. A stator as set forth in claim 1,
    wherein the first phase winding is wound such that an end of the first wire and an end of the second wire are disposed in the same slot and are electrically connected together;
    wherein the second phase winding is wound such that an end of the third wire and an end of the fourth wire are disposed in the same slot and are electrically connected together; and
    wherein the third phase winding is wound such that an end of the fifth wire and an end of the sixth wire are disposed in the same slot and are electrically connected together.

3. A stator as set forth in claim 2, wherein the remaining ends of the first, second, third, fourth, fifth and sixth wires are electrically connected together.

4. A stator as set forth in claim 1, wherein each group of coils forms at least two poles, the number of poles being represented by the number (n) and the poles being numbered from 1 to (n), wherein the groups of coils having the first pattern are wound such that the coils forming the odd-numbered poles are wound in a first direction and the coils forming the even-numbered poles are wound in a second direction, wherein the groups of coils having the second pattern are wound such that the coils forming the odd-numbered poles are wound in the second direction and the coils forming the even-numbered poles are wound in the first direction, and wherein the second direction is opposite the first direction.

5. A stator as set forth in claim 4, wherein (n) is four.

6. A stator as set forth in claim 4, wherein each pole has two coils.

7. A stator as set forth in claim 6, wherein each coil has one or more turns, the number of turns being represented by the number (x) where (x) is odd.

8. A stator as set forth in claim 6, wherein each pole is wound as a six/five pitch configuration.

9. A stator as set forth in claim 4, wherein the first direction is a clockwise direction.

10. A stator for a three-phase motor, the stator comprising:
    a core having a plurality of slots that receives wire;
    a first phase winding, a second phase winding, and a third phase winding wound on the core, each phase winding comprising:
        coils forming at least four poles, the number of poles being represented by the number (m) where (m) is an even number,
        whereby the coils forming the poles are divided into two groups, the first group includes the coils forming poles 1 to (m/2) and the second group includes the coils forming poles ((m/2) +1) to (m);
        whereby the coils forming the odd-numbered poles of the first group and the even-numbered poles of the second group are wound in a first direction;
        whereby the coils forming the even-numbered poles of the first group and the odd-numbered poles of the second group are wound in a second direction opposite the first direction.

11. A stator as set forth in claim 10, wherein (m) is eight.

12. A stator as set forth in claim 10, wherein each pole has two coils.

13. A stator as set forth in claim 12, wherein the two coils forming each pole are wound in a six/five pitch configuration.

14. A stator as set forth in claim 10, wherein each coil has one or more turns, the number of turns being represented by the number (x) where (x) is odd.

15. A stator as set forth in claim 10, wherein each phase winding comprises two wires, and wherein the first wire of each phase winding forms the first group of coils, respectively, and the second wire of each phase winding forms the second group of coils, respectively.

16. A stator as set forth in claim 15, wherein the first and second wires of each phase winding are connected in parallel.

17. A stator as set forth in claim 15, wherein each phase winding is wound such that a first end of the first wire and a first end of the second wire are disposed next to each other in the same slot.

18. A three-phase induction motor, comprising:
    a stator, comprising:
        a core comprising a plurality of slots formed in the core that receives wire; and
        a first phase winding, a second phase winding, and a third phase winding,
            each phase winding being wound onto the stator and comprising:
                a first and second wire connected in parallel, each wire comprising eight coils forming four numbered poles, each pole has two coils wound in a six/five pitch configuration, and each coil has three turns of wire;
                whereby each winding is wound such that one end of the first wire and one end of the second wire are disposed in the same slot,
                whereby each winding is wound such that the coils forming the first and third poles of the first wire are wound in a first direction, the coils forming the second and fourth poles of the first wire are wound in a second direction, the first and third poles of the second wire are wound in the second direction and the coils forming the second and fourth poles of the second wire are wound in the first direction, and
                whereby the second direction is opposite the first direction.

* * * * *